United States Patent
Moraglio et al.

(10) Patent No.: US 12,001,812 B2
(45) Date of Patent: Jun. 4, 2024

(54) ISING MACHINE DATA INPUT APPARATUS AND METHOD OF INPUTTING DATA INTO AN ISING MACHINE

(71) Applicant: FUJITSU LIMITED, Kawasaki (JP)

(72) Inventors: Alberto Moraglio, London (GB); Serban Georgescu, London (GB)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/832,674

(22) Filed: Mar. 27, 2020

(65) Prior Publication Data
US 2020/0401374 A1    Dec. 24, 2020

(30) Foreign Application Priority Data

Jun. 21, 2019 (EP) ................................ 19181833

(51) Int. Cl.
G06F 7/548      (2006.01)
G06F 17/18     (2006.01)

(52) U.S. Cl.
CPC .............. *G06F 7/548* (2013.01); *G06F 17/18* (2013.01)

(58) Field of Classification Search
CPC .......... G06N 10/00; G06N 20/00; G06N 7/00; G06N 7/005; G06N 7/06; G06N 7/08; G06F 17/10; G06F 17/11–13; G06F 17/16; G06F 17/17; G06F 17/18
See application file for complete search history.

(56) References Cited

U.S. PATENT DOCUMENTS

| | | |
|---|---|---|
| 2012/0045136 A1 | 2/2012 | Rose |
| 2014/0025606 A1 | 1/2014 | Macready |
| 2017/0177751 A1 | 6/2017 | Macready et al. |
| 2017/0255592 A1* | 9/2017 | Karimi .................. G06N 5/025 |
| 2017/0255872 A1 | 9/2017 | Hamze et al. |
| 2018/0137192 A1 | 5/2018 | Zaribafiyan et al. |
| 2018/0308007 A1 | 10/2018 | Amin et al. |

(Continued)

FOREIGN PATENT DOCUMENTS

WO    WO 2017/214293 A1    12/2017

OTHER PUBLICATIONS

D. Patterson et al., Computer Organization and Design, the Hardware/Software Interface, Elsevier, 3rd ed., 2005 (Year: 2005).*

(Continued)

*Primary Examiner* — Emily E Larocque
(74) *Attorney, Agent, or Firm* — STAAS & HALSEY LLP

(57) ABSTRACT

Apparatus and method of inputting data into an Ising machine. The apparatus may comprise at least one processor to carry out a conversion process to convert an input expression, in a format unsuitable for inputting into an Ising machine, to a suitable format, including creating a dataset of input-output data pairs on the basis of the input expression, deriving a mathematical expression by fitting a first dataset subset to coefficients of an exemplary mathematical expression in the suitable format, and using a second dataset subset, different from the first, to assess whether the derived expression meets a preset quality metric. The derived expression is input to the Ising machine when it is assessed as meeting the metric. The conversion process may be repeated using a different input expression when the derived expression is assessed as failing to meet the metric.

14 Claims, 7 Drawing Sheets

(56) References Cited

U.S. PATENT DOCUMENTS

2018/0349282 A1* 12/2018 Brahm .................. G06N 3/126
2019/0019103 A1    1/2019 Dadashikelayeh
2019/0362270 A1* 11/2019 Haener ................ G06F 30/337
2020/0027029 A1*  1/2020 Linvill .................... G06N 7/00

OTHER PUBLICATIONS

J. Hennessy, Computer Architecture: A Quantitative Approach, 3rd edition, 2003 (Year: 2003).*
European Search Report dated Dec. 19, 2019 in European Patent Application No. 19181833.5.
Masataka Sao et al., "Application of Digital Annealer for Faster Combinatorial Optimization", Fujitsu Scientific & Technical Journal, vol. 55, No. 2, 2019, pp. 45-51.
"Application of Digital Annealer for Faster Combinatorial Optimization", Fujitsu Magazine, vol. 69, No. 4, 2018, pp. 77-83.

* cited by examiner

ISING MACHINE DATA INPUT APPARATUS AND METHOD OF INPUTTING DATA INTO AN ISING MACHINE

CROSS-REFERENCE TO RELATED APPLICATION(S)

This application is based on and hereby claims priority to European Patent Application No. 19181833.5, filed Jun. 21, 2019, in the European Intellectual Property Office, the disclosures of which are incorporated herein by reference.

FIELD

Embodiments of the present invention relate to an Ising machine data input apparatus and a method of inputting data into an Ising machine.

DESCRIPTION OF THE RELATED ART

Optimization is the process of finding the best (or close to the best) solution from a set of possible solutions. Combinatorial optimization is a subset of optimization which consists of finding an optimal (or close to optimal) object in a finite set of objects. Examples of combinatorial optimization problems are task scheduling, vehicle routing, portfolio optimization, only to name a few. Most combinatorial optimization problems are very hard to solve in the sense that it would take an impractical amount of time (e.g. years, millennia or more) to obtain the exact optimum. As such, many approximation techniques that obtain a close approximation (usually within a few percent of the exact optimum), but in a practical amount of time (e.g. seconds, minutes, hours or days), have been devised. Examples of such approximate techniques are Simulated Annealing or Evolutionary Optimization.

An Ising Machine (also called an annealer) is an optical computer capable of very quickly and efficiently solving certain classes of combinatorial optimization problems. Such specialized computing architecture may provide orders of magnitude speedup when solving combinatorial optimization problems. Examples of Ising Machines that exist today are FUJITSU'S DIGITAL ANNEALER™ or the machines provided by D-WAVE SYSTEMS™ (such as the D-Wave 2000Q™).

An Ising Machine will, given an initial input configuration, evolve it to an output configuration that minimizes the total "energy" of the system. The input configuration is in general represented as a 2D matrix containing positive and negative entries (denoted as +1 and −1, 0 or 1 or, spin-up spin-down). An example of this process is given in FIG. 2 of the accompanying drawings where positive/negative entries are depicted using white/black dots respectively. The system is provided with the random initial state on the left side and, after a certain amount of time, will reach the minimum (or close to minimum) energy state shown on the right side, which will be its output.

In order to be able to be solved on an Ising Machine, an initial optimization problem has to be translated to a Quadratic Unconstrained Binary Optimization (QUBO) form which usually requires two steps: converting from a Non-Binary formulation to a Binary formulation and converting the Binary formulation to a Quadratic Unconstrained formulation. Today, converting an optimization problem to a QUBO form is a difficult, time-consuming manual process that may only be performed by human experts, as shown in the top of FIG. 1 of the accompanying drawings.

A QUBO formulation of order N is expressed by the following formula:

Equation 1

QUBO formulation $$E(X_1, X_2, \ldots X_N) = \sum_{i=1}^{N} c_i X_i + \sum_{i=1}^{N} \sum_{j=1}^{i} Q_{ij} \times X_i \times X_j$$

with $X_i \in \{0, 1\}$ and $c_i, Q_{ij} \in R$.

In the formula above E( ), the expression to be minimized (corresponding to the energy of the system), is formulated using the coefficient vector $c_i$ and matrix $Q_{ij}$ for the linear and quadratic part, respectively. The vector $X=(X_1 \ldots X_n)$ represents the configuration.

The QUBO formulation above is very different from the usual formulation of an optimization problem, which is as follows:

$$\begin{aligned} &\underset{x}{\text{minimize}} \, f(x) \\ &\text{subject to} \, \, g_i(x) \leq 0, \quad i = 1, \ldots, m \\ &\phantom{\text{subject to}} \, \, h_j(x) = 0, \quad j = 1, \ldots, p \end{aligned}$$

In the usual formulation shown above, a function f(x) is minimized subject to constraints which may be given in an inequality form (represented by functions $g_i$) or equality form (represented by functions $h_j$) and x is a vector that is in general of a non-binary form.

While many ways of converting text book problems from their usual form into a QUBO form are known, in practice this is a very difficult process that requires specialized expertise. Such expertise is rarely available since all commercial optimization packages available today take the input problem in its usual form. This is because the requirement to convert a problem to its QUBO form is only specific to Ising Machines and not to other traditional ways of solving optimization problems.

This difficulty may be easily illustrated using the example of the Maximum Clique problem, a text-book combinatorial optimization problem. The problem statement is as follows:

Given an undirected graph G=(V, E), a clique is a subset S of the vertices forming a complete subgraph, meaning that any two vertices of S are connected by an edge in G.

The clique size is the number of vertices in S, and the maximum clique problem is to find a clique with a maximum number of vertices in G.

An example of a graph with its maximum clique is shown in FIG. 3.

The usual formulation of the maximum clique problem as an optimization problem is the following:

Objective Function: Maximize f(S)=|S| for any subset S of V

Constraints: for all i, j in S (i<>j): (i,j) in E

A very straightforward way to convert this optimization problem into a binary one is the following Encoding: A subset S of V is represented as a binary vector x of size N=|V| so that x[i]=1 means node i is in S.

Solution Space: any binary vector x of length N

Objective Function: f(x)=sum(x) to maximise

Constraints: for all i, j in [1,N] (i<>j) such that x[i]=1 and x[j]=1: (i,j) in E The QUBO formulation for the same problem is the following:

$$H = A\left(K - \sum_v x_v\right)^2 + B\left[\frac{K(K-1)}{2} - \sum_{(uv)\in K} x_u x_v\right]. \quad \text{Equation 2}$$

This example shows that, while the formulation of the maximum clique problem as a binary optimization problem is relatively straightforward, its transformation into a QUBO formulation is much more complex.

Moreover, the QUBO formulation above is not the most efficient one, in the sense that there are other known formulations that use less quadratic terms. The simplest known such formulation is the one below, however in order to reach this formulation strong mathematical insight has been used by a human:

$$H = -A\sum_{i=1}^{N} x_i + B\sum_{(i,j)\in E} x_i x_j, \quad \text{Equation 3}$$

To summarize, the current process of manually converting optimization problems from their usual form to their QUBO form suffers from two issues:
1. It is difficult, time consuming and requires specialized expertise
2. The QUBO formulation created by an expert may be more complex than necessary

SUMMARY

According to an embodiment, an Ising machine data input apparatus comprises a memory and at least one processor coupled to the memory. The at least one processor, according to an embodiment, may be configured to receive an input expression, representing an optimization problem, in a format unsuitable for inputting into an Ising machine and carry out a conversion process to convert the input expression to a format suitable for inputting into the Ising machine. The at least one processor, according to an embodiment, may perform the conversion process by creating a dataset (for example, via a software interpreter) of input-output data pairs on the basis of the input expression, and deriving a mathematical expression corresponding to the input expression by fitting a first subset of the dataset created to coefficients of an exemplary mathematical expression in the format suitable for inputting into the Ising machine. According to an embodiment, the at least one processor may use a second subset of the dataset created, which is different from the first subset, to assess whether the derived mathematical expression meets a preset quality metric. The derived mathematical expression is output for input to the Ising machine when the derived mathematical expression is assessed as meeting the preset quality metric, where the conversion process is repeated using a different input expression representing the optimization problem when the derived mathematical expression is assessed as failing to meet the preset quality metric.

An embodiment may provide a computer-implemented method of inputting data into an Ising machine, the method comprising: receiving an input expression, representing an optimization problem, in a format unsuitable for inputting into the Ising machine; carrying out a conversion process to convert the input expression to a format suitable for inputting into the Ising machine. According to an embodiment, the conversion process comprising: creating a dataset of input-output data pairs on the basis of the input expression; deriving a mathematical expression corresponding to the input expression by fitting a first subset of the dataset to coefficients of an exemplary mathematical expression in the format suitable for inputting into the Ising machine; and assessing, using a second subset of the dataset, different from the first subset, whether the derived mathematical expression meets a preset quality metric; and outputting the derived mathematical expression for input to the Ising machine when the derived mathematical expression is assessed as meeting the preset quality metric, or repeating the conversion process using a different input expression representing the optimization problem when the derived mathematical expression is assessed as failing to meet the preset quality metric.

An embodiment may provide a computer program which, when run on a computer, causes the computer to carry out a method.

The suitable format may be a Quadratic Unconstrained Binary Optimization (QUBO) formulation, a Cubic Unconstrained Binary Optimization (CUBO) formulation, or a higher order Unconstrained Binary Optimization formulation.

Embodiments may provide fully automatic or semi-automatic methods for converting an initial (binary or non-binary) expression of an optimization problem into a QUBO (or higher order) formulation, for example as shown in the bottom of FIG. 1 of the accompanying drawings.

The input expression may be a mathematical expression, but may be any other formulation of the optimization problem. The input expression may be in non-binary form.

In an embodiment the number of input-output data pairs in the first sub-set may be equal to the number of coefficients in the exemplary mathematical expression.

Causing the converter to repeat the conversion process may include prompting a user to input the different input expression.

Assessing whether the derived mathematical expression meets the preset quality metric may comprise determining whether outputs obtained using the derived mathematical expression are sufficiently similar to outputs obtained using the input expression. The outputs may be determined as being sufficiently similar when a difference (for example, an aggregated difference) between the outputs meets a preset criterion, for example that the difference between the outputs is below a preset threshold.

Formulation of at least one of the input expression and the different input expression may be guided by a human user.

BRIEF DESCRIPTION OF THE DRAWINGS

Aspects and advantages of the present invention will become apparent and more readily appreciated from the following description of the embodiments, taken in conjunction with the accompanying drawings. Reference will now be made, by way of example, to the accompanying drawings, in which.

DETAILED DESCRIPTION

Figure 1:
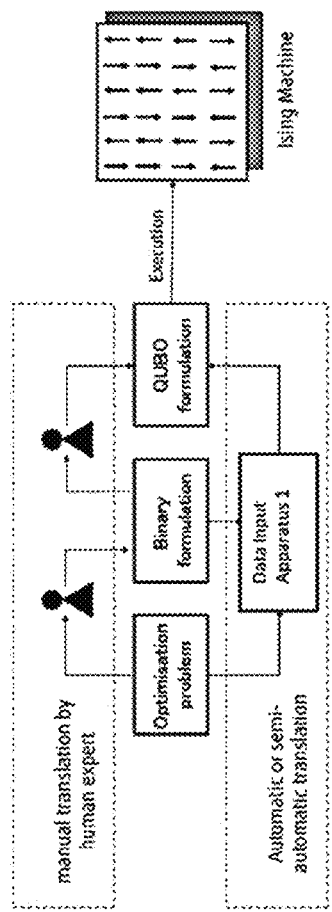
FIG. 1 is a high level diagram illustrating a comparison between a method of inputting data to an Ising machine according to an embodiment and a current technique.
Figure 2:
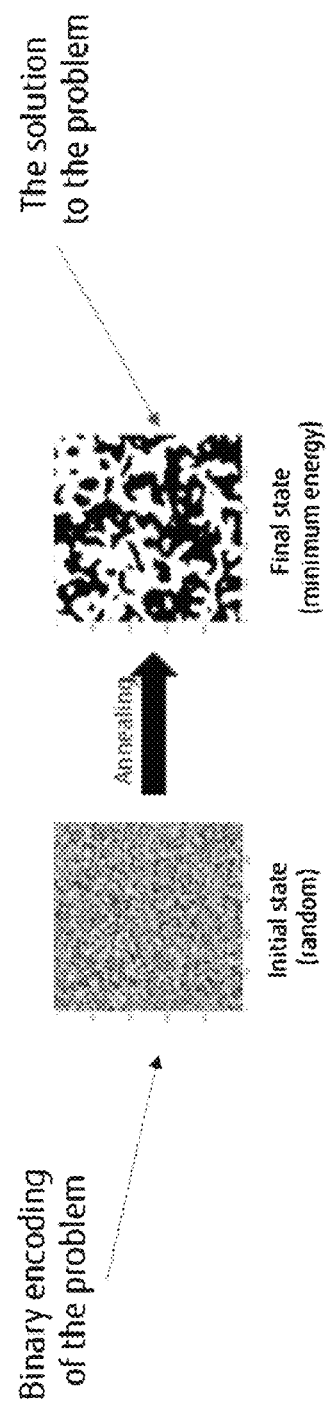
FIG. 2 is a diagram useful for understanding the meaning of "annealing" in the context of this specification.

Reference will now be made in detail to the present embodiments of the present invention, examples of which are illustrated in the accompanying drawings, wherein like reference numerals refer to the like elements throughout. The embodiments are described below to explain the present invention by referring to the figures. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The bottom of FIG. 1 illustrates the data input apparatus 1 (Ising machine data input apparatus) according to an embodiment. FIG. 1 (bottom dashed outline) shows fully automatic or semi-automatic methods for converting (translating) an initial (binary or non-binary) expression of an optimization problem into a QUBO (or higher order) formulation that may be provided by the data input apparatus 1.

Embodiments may allow the QUBO (or higher order) formulation obtained to be the correct one, and not merely an approximation; that is the formulation is guaranteed to have the same global optimum of the original input function when it is possible to convert the input function to QUBO (or higher order) form, or at least correct with high probability (when it may not be possible to convert the original input function to QUBO (or higher order) form, but the test error is zero or below numerical machine error threshold).

Use of an embodiment may allow:
the usage of Ising Machines to be broadened, by allowing non-expert users to translate their optimization problems into QUBO (or higher order) form
a simpler (i.e. more efficient) QUBO (or higher order) formulation for a given problem to be obtained in general, which conventionally would have to be derived by a human user having deep mathematical insight. More efficient formulations may translate to a shorter time to solution.

Figure 4A:
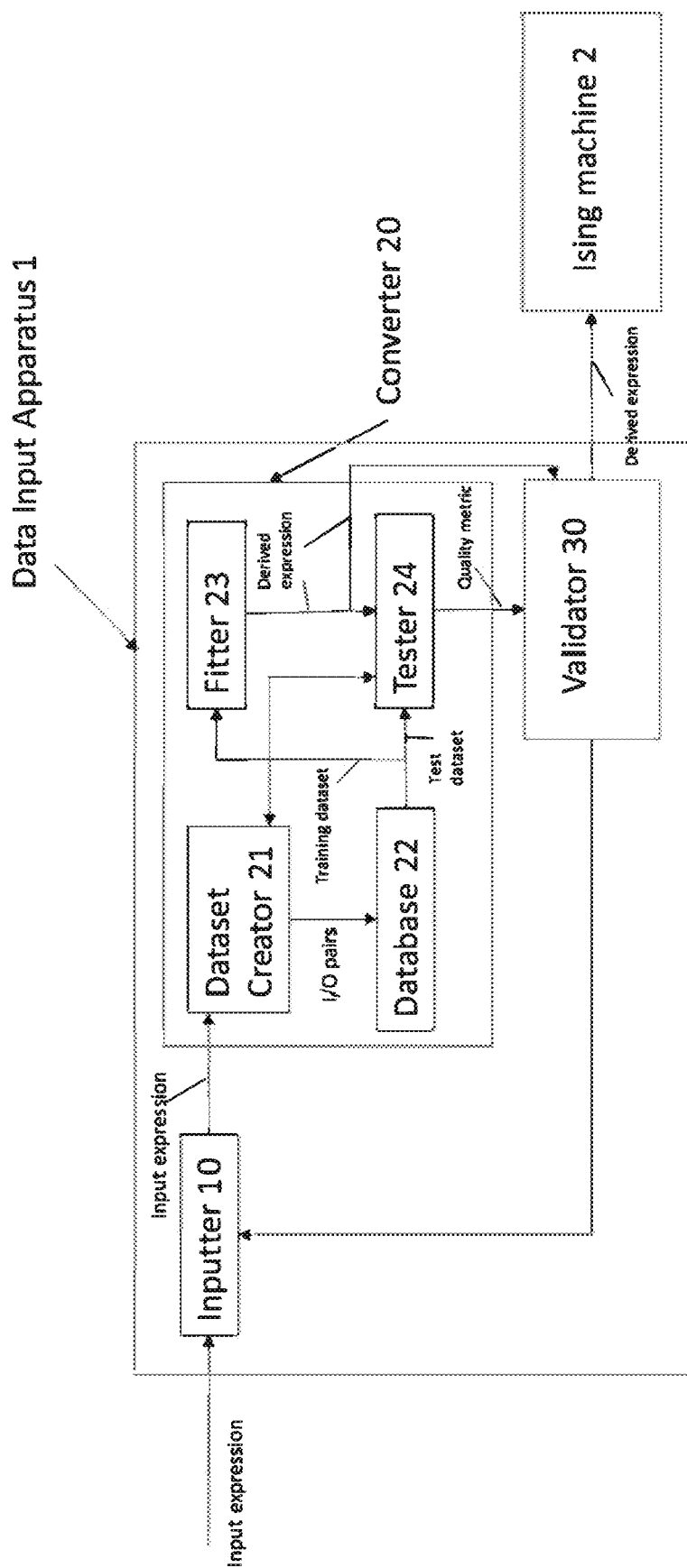
FIG. 4A is a schematic diagram of data input apparatus according to an embodiment.

An Ising machine data input apparatus 1 according to an embodiment is shown in FIG. 4A. The apparatus 1 comprises an inputter 10 to receive an input expression representing an optimization problem in a format unsuitable for inputting into an Ising machine 2 and a converter 20 to carry out a conversion process to convert the input expression to a format suitable for inputting into an Ising machine. The converter 20 comprises a dataset creator 10 to create a dataset of input-output data pairs on the basis of the input expression, the input-output pairs being stored in a database 22, a fitter 23 to derive a mathematical expression corresponding to the input expression by fitting a first subset of the dataset created by the dataset creator 21 to coefficients of an exemplary mathematical expression in a format suitable for inputting into the Ising machine 2, and a tester 24 to use a second subset of the dataset created by the dataset creator 21, different from the first subset, to assess whether the derived mathematical expression meets a preset quality metric. The apparatus 1 further comprises a validator 30 to output the derived mathematical expression for input to the Ising machine 2 when the derived mathematical expression is assessed as meeting the preset quality metric, and to cause the converter 20 to repeat the conversion process using a different input expression representing the optimization problem when the derived mathematical expression is assessed as failing to meet the preset quality metric.

The apparatus 1 illustrated in FIG. 4A may be implemented by hardware including at least one hardware processor, or by hardware in combination with software.

Figure 4B:
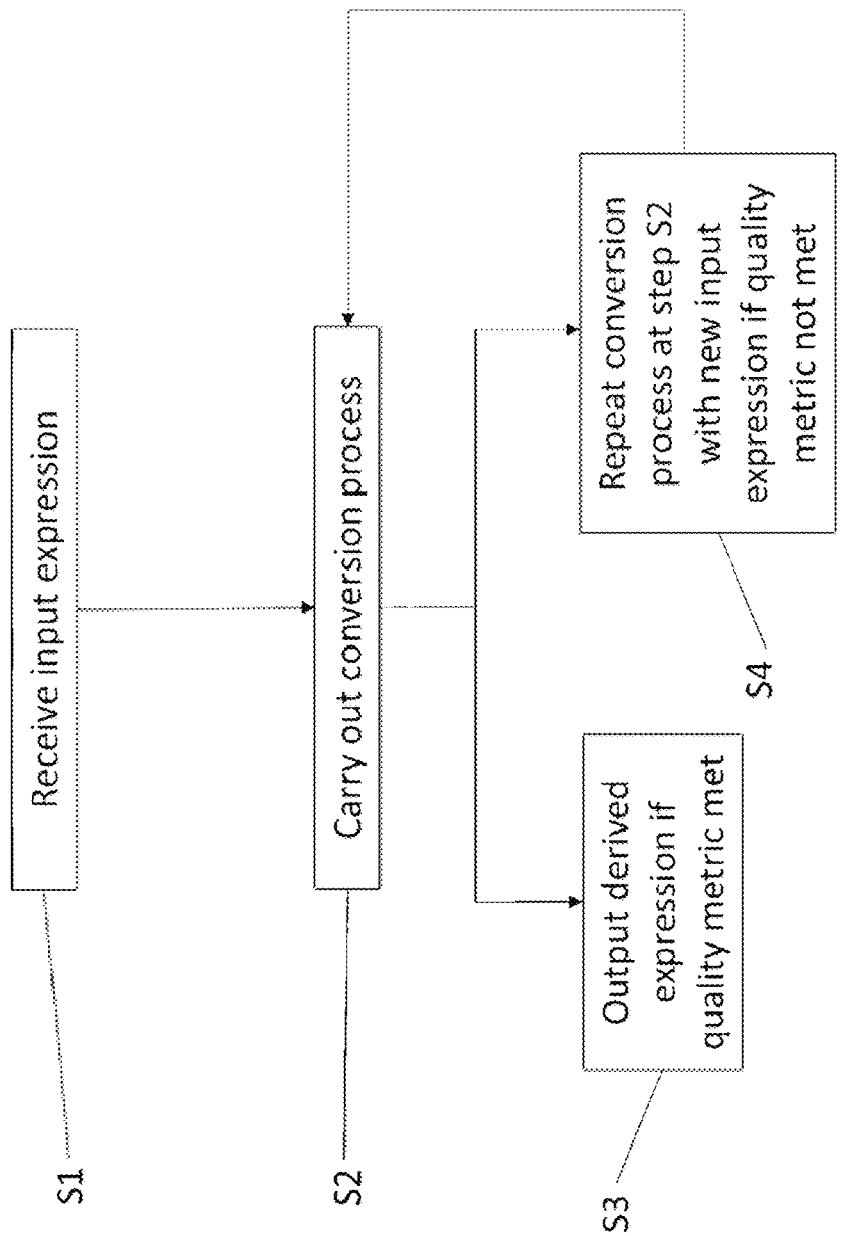
FIG. 4B is a flowchart of a method of data input according to an embodiment.

As shown in FIG. 4B, according to an embodiment a computer-implemented method of inputting data into an Ising machine comprises in operation S1 receiving, for example by the inputter 10 of the apparatus 1 shown in FIG. 4A, an input expression representing an optimization problem in a format unsuitable for inputting into the Ising machine. In operation S2 a conversion process is carried out, for example by the converter 20 of the apparatus 1 shown in FIG. 4A, to convert the input expression to a format suitable for inputting into the Ising machine. The conversion process comprises: creating, for example by the dataset creator 21 of the apparatus 1 shown in FIG. 4A, a dataset of input-output data pairs on the basis of the input expression and storing the input-output pairs, for example in the database 22 of the apparatus 1 shown in FIG. 4A; deriving a mathematical expression corresponding to the input expression by fitting, for example using the fitter 23 of the apparatus 1 shown in FIG. 4A, a first subset of the dataset to coefficients of an exemplary mathematical expression in a format suitable for inputting into the Ising machine; and using a second subset of the dataset, different from the first subset, to assess, for example using the tester 24 of the apparatus 1 shown in FIG. 4A, whether the derived mathematical expression meets a preset quality metric. When the derived mathematical expression is assessed as meeting the preset quality metric, in operation S3 the derived mathematical expression is output to the Ising machine, for example by the validator 30 of the apparatus 1 shown in FIG. 4A. Alternatively, when the derived mathematical expression is assessed as failing to meet the preset quality metric, in operation S4 the conversion process is caused, for example by the validator 30 of the apparatus 1 shown in FIG. 4A, to be repeated using a different input expression representing the optimization problem.

Figure 5:
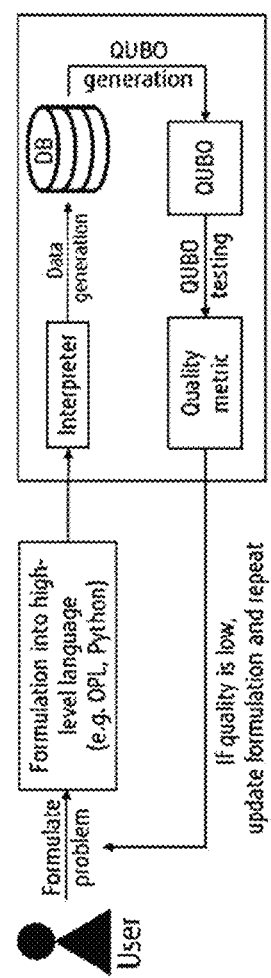
FIG. 5 is a high-level description of a method according to an embodiment.

A high level description of a semi-automatic method for inputting data into an Ising machine according to an embodiment is provided below with reference to FIG. 5, using as an example an Ising machine requiring input in the form of a QUBO formulation.

Firstly a user, usually with expertise in optimization but not in QUBO generation, formulates the optimization problem in a "natural" way. An example of natural ways of describing the problem is using the format required by a commercial optimization package (e.g. OPL for the C-Plex), in a programming language (e.g. Python) or in a mathematical form. The optimization problem formulated is then evaluated by a dataset creator, which may for example be an "interpreter" module, where by "interpreter" is meant software capable of reading, understanding and evaluating the formulation. For example, if the optimization problem (that is, the cost function and associated constraints) are expressed as a Python function, then the interpreter may be off-the-shelf Python interpreter software. Given a set number of data points (denoted NC), the interpreter is used to evaluate the cost functions and constraints and to generate NC input-output pairs, which are stored in a database. A subset of the set of NC input-output pairs forms a training dataset and the remainder forms a test dataset. A fitting procedure is used to obtain the QUBO formulation (that is, the coefficient vector ci and matrix Qij from Equation 1) using the training dataset. The QUBO formulation is evaluated on the test dataset and a quality metric consisting of the matching score is reported to the user. If the quality of the resulting QUBO formulation is considered to be good, the process is complete. Otherwise, the formulation of the problem is changed, either manually by a user or automatically using an algorithm (there are multiple ways in which the cost function and the constraints may be formulated for the same problem) and the process is repeated.

An example of training and test dataset generation will now be explained in more detail. Given a target function, i.e. the input expression, and an input vector, an input-output pair may be created using the process shown in FIG. 6.

The input vector is part of a set of possible solutions (i.e. belongs to the solution space) and may be generated either randomly or following an algorithm. For ease of explanation the input vector is considered to be binary, however automatic conversion from a non-binary formulation to a binary formulation is possible, for example using known methods such as one-hot encoding.

In operation S61 interpreter software, that is capable of understanding the target function, computes its value (evaluates it) at the input vector to produce an output value. The output value is a real value (a scalar). At operation S62 the input vector and its associated output value for the target function are stored in database 22.

Figure 6:
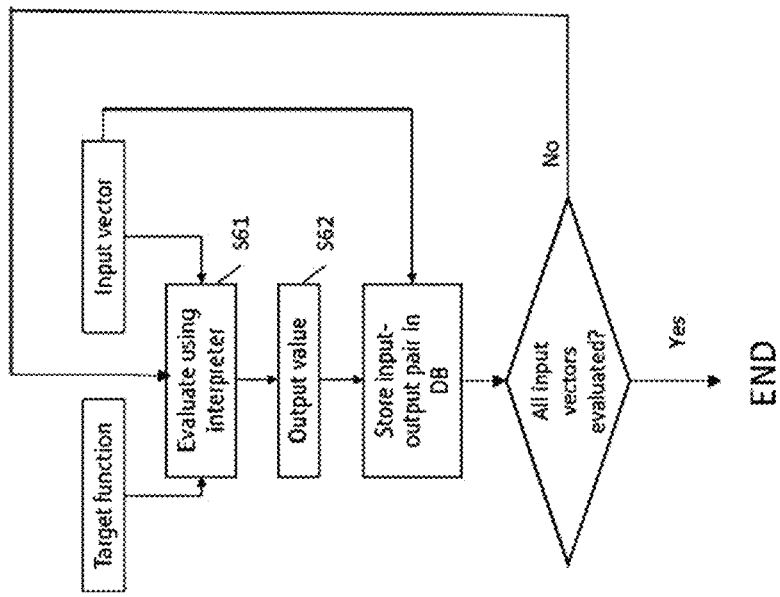
FIG. 6 is a flowchart of an input-output pair generation process for use in an embodiment.

Operations S61 and S62 of the dataset generation process shown in FIG. 6 are repeated to create a training dataset and a test dataset of a desired size.

For a problem of size N where N denotes the length of the binary input vector and the QUBO formulation shown in Equation 1, the training dataset should contain NTRAIN=N*(N+1)/2 data points. While it is possible to use the proposed method with more or less data points, NTRAIN represents the optimum number of data points to use since this is the number of coefficients in a QUBO expression of size N.

The size of the test dataset NTEST will be a number between 1 and $2^N$—NTRAIN (where $2^N$ is the total size of the input dataset). In general, to strike a good balance between testing accuracy and computing time, it may be chosen to be a small percentage (e.g. 1-10%) of NTRAIN.

An example of QUBO formulation generation will now be explained in more detail. The process of using the database of input-output pairs in order to automatically generate a QUBO expression is given in FIG. 7. In operation S71 NTRAIN input-output pairs are extracted from database 22 to form the training dataset. In operation S72 traditional function fitting (for example, multivariate polynomial regression of order 2) is used to fit the NTRAIN input-output pairs to a QUBO expression of size N. Since a QUBO formulation of size N has exactly N*(N+1)/2, i.e. NTRAIN, coefficients, the fitting may be done exactly. In practice, the fitting procedure is reduced to solving a large system of linear equations of size NTRAIN by NTRAIN which may be done very efficiently on modern computing architecture such as CPUs or CPUs. In operation S73 the coefficient vectors $c_i$ and matrix $Q_{ij}$ obtained by the fitting are output.

Note that while in this embodiment the standard QUBO formulation has been used as the target of the fitting procedure, it should be understood that this procedure will work for any variation of the QUBO function. Examples of such variations are:

The additional of a constant coefficient
The removal of some of the coefficients when they are known to have zero values due to, among other things, hardware architecture constraints of the Ising Machine into which the QUBO formulation is to be input Furthermore, while this embodiment has been described with reference to a QUBO formulation, it should be noted that the same procedure will work for other types of expressions such as CUBO (Cubic Unconstrained Binary Optimization) and higher order forms.

In all cases above, it should be understood that if the form of the target expression changes, so will the size of training dataset NTRAIN. In such cases NTRAIN will be set to the total number of unique coefficients in the expression.

Figure 8:
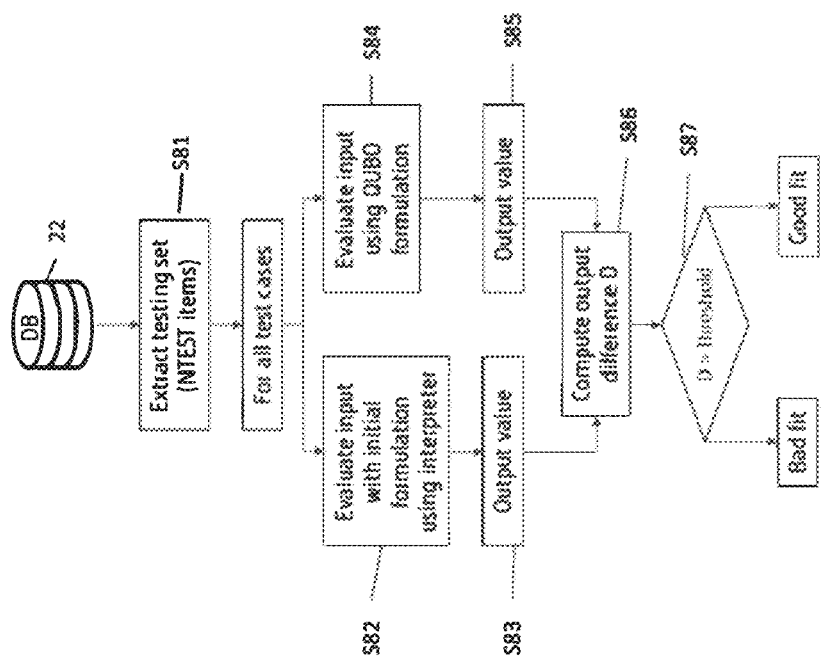
FIG. 8 is a flowchart of a testing process for use in an embodiment.

An example of QUBO testing will now be explained in more detail. The process of testing the quality of the QUBO expression using the coefficient vectors $c_i$ and matrix $Q_{ij}$ obtained in the fitting process is shown in FIG. 8. In operation S81 NTEST input-output pairs are extracted from database 22 to form the test dataset. Operations S82 to S85 are then carried out for all input-output pairs of the test dataset. In operations S82 and S83 the interpreter evaluates the initial formulation of the input expression at the input vector to produce an output value. In operations S84 and S85 the same or a different interpreter evaluates the derived QUBO expression at the input vector and produces an output value. At operation S86 the expression in both its initial and its QUBO form are compared on all data in the test dataset and their errors are aggregated into a value D representing the aggregated difference between the two forms. Examples of aggregation techniques could be sum, average, RMS, etc. In operation S87 the aggregated difference value D is compared to a preset threshold. If the aggregated difference D exceeds a set threshold, then the test returns a negative result (i.e. bad fit). A positive result (i.e. good fit) will be returned in the opposite case. In practice, the value of the threshold would be a few orders of magnitude smaller than machine error (e.g. in the range 1e-3 to 1e-6).

Figure 3:
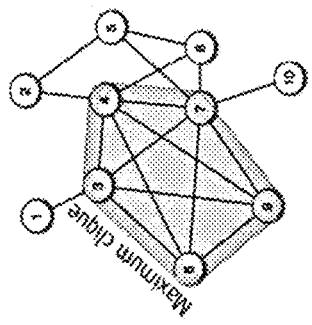
FIG. 3 is an undirected graph for explaining a particular optimization problem.

As an example, reference is again made to the Maximum Clique Problem discussed earlier, taking the particular example below, which corresponds to the graph shown in FIG. 3.

---

N = 10
E = {(1,3), (2,4), (2,5), (3,6), (3,9), (3,7), (3,4), (4,6), (4,9), (4,7), (4,8), (5,7), (5,8), (6,7), (6,9), (7,8), (7,9), (7,10)}

---

A typical formulation of the objective function and associated constraint of the Maximum Clique problem, written in Python language, is as follows:

---

```
def objective_function(x) : return sum(x)
def logical_constraint(x) : return all((i+1,j+1) in E for (i, j)
    in combinations(range(N),2) if x[i]==1 and x[j]==1)
```

The formulation above is a natural way of expressing this graph problem and is not in any way related to a QUBO formulation. This constrained formulation is converted into an unconstrained formulation in the usual way, by adding penalty factors A and B, to arrive at the following unconstrained function f(x) to be minimized:

---
def f(x): return −A * objective_function(x) −B * int(logical_constraint(x))

---

In the above, x is a binary vector of size N. One example of x is (0, 0, 1, 1, 0, 1, 1, 0, 1, 0), which happens to be the optimal solution corresponding to the subgraph highlighted in red in FIG. 3. The values of A and B are 1 and 11, respectively.

Next, test and training datasets are created using Python as the interpreter. NTRAIN, the total number of input/output pairs in the training dataset, is chosen so as to be equal to the total number of unique QUBO coefficients and may be computed using the following formula: NTRAIN=((N+1)*N/2)+1 (here the +1 in the expression is due to the extra constant term included in the QUBO formulation). In this example NTEST=10, however any number between 1 and $2^N$—NTRAIN would be possible. Both the training and test datasets use randomly generated input vectors, with the condition that the two datasets may not overlap.

For example, the training dataset may be:
(1, 0, 1, 0, 1, 1, 0, 1, 1, 0)→−6
(0, 0, 0, 0, 1, 0, 0, 1, 1, 1)→−4
(1, 0, 1, 1, 1, 0, 0, 0, 0, 1)→−5
(0, 1, 1, 1, 0, 1, 0, 0, 1, 1)→−6
(0, 0, 0, 0, 0, 0, 1, 1, 0, 1)→−3
(0, 0, 0, 1, 0, 0, 1, 1, 1, 0)→−4
(1, 1, 1, 1, 1, 1, 1, 0, 0, 0)→−7
(0, 0, 0, 0, 1, 0, 0, 0, 0, 0)→−12
(0, 0, 1, 1, 0, 0, 1, 1, 0, 1)→−5
(0, 0, 1, 0, 0, 0, 1, 1, 1, 0)→−4
(0, 0, 0, 1, 0, 0, 0, 1, 0, 1)→−3
(1, 1, 1, 1, 0, 0, 1, 1, 0, 0)→−6
(0, 0, 1, 0, 1, 1, 0, 0, 1, 1)→−5
(0, 0, 0, 0, 0, 1, 1, 0, 1, 1)→−4
(1, 0, 0, 0, 0, 0, 1, 0, 0, 1)→−3
(1, 0, 1, 0, 1, 0, 1, 0, 0, 1)→−5
(1, 0, 0, 1, 1, 1, 0, 1, 0, 1)→−6
(1, 0, 1, 0, 1, 1, 0, 0, 0, 0)→−4
(1, 0, 0, 0, 1, 0, 1, 1, 0, 1)→−5
(0, 1, 0, 0, 0, 1, 1, 1, 1, 1)→−6
(1, 0, 0, 0, 1, 1, 1, 0, 1, 0)→−5
(0, 0, 1, 1, 0, 1, 1, 0, 0, 1)→−5
(1, 1, 0, 0, 0, 0, 1, 1, 1, 1)→−6
(0, 1, 0, 1, 1, 1, 1, 1, 1, 1)→−8
(1, 0, 1, 1, 1, 1, 1, 0, 0, 1)→−7
(0, 1, 0, 1, 1, 1, 1, 0, 0, 0)→−5
(1, 0, 0, 0, 1, 1, 0, 0, 1, 1)→−5
(1, 0, 0, 1, 1, 0, 1, 1, 1, 0)→−6
(0, 1, 0, 1, 0, 1, 1, 1, 0, 1)→−6
(0, 0, 0, 0, 0, 0, 1, 0, 0, 1)→−13
(1, 0, 1, 0, 1, 1, 1, 1, 0, 0)→−6
(0, 1, 1, 1, 1, 1, 0, 0, 1, 0)→−6
(1, 0, 0, 0, 1, 0, 1, 1, 1, 0)→−5
(0, 0, 1, 1, 0, 1, 0, 1, 0, 1)→−5
(1, 1, 0, 0, 0, 1, 1, 0, 1, 1)→−6
(1, 0, 1, 0, 0, 0, 1, 1, 1, 0)→−5
(0, 0, 0, 1, 1, 0, 0, 1, 0, 0)→−3
(1, 0, 0, 0, 0, 1, 0, 0, 0, 1)→−3
(1, 1, 1, 0, 0, 0, 1, 0, 0, 1)→−6
(0, 1, 0, 1, 1, 0, 0, 0, 1, 1)→−5
(1, 1, 1, 0, 1, 0, 1, 0, 1, 0)→−6
(0, 1, 1, 1, 0, 1, 0, 1, 0, 1)→−6
(1, 0, 1, 1, 1, 0, 0, 1, 1, 1)→−7
(0, 0, 0, 0, 0, 0, 0, 1, 0, 0)→−12
(1, 0, 1, 0, 1, 1, 0, 0, 0, 1)→−5
(1, 0, 1, 0, 0, 0, 0, 0, 0, 0)→−13
(1, 0, 0, 1, 0, 1, 0, 1, 1, 1)→−6
(1, 1, 1, 1, 0, 1, 0, 0, 1, 1)→−7
(1, 0, 0, 0, 0, 0, 1, 0, 0, 0)→−2
(1, 1, 0, 0, 0, 1, 1, 0, 0, 1)→−5
(1, 1, 0, 1, 0, 0, 0, 0, 1, 0)→−4
(0, 1, 0, 1, 0, 0, 1, 1, 1, 1)→−6
(0, 0, 0, 0, 1, 0, 1, 1, 0, 0)→−14
(0, 0, 1, 1, 0, 1, 1, 1, 0, 1)→−6
(0, 1, 0, 0, 1, 0, 1, 1, 0, 1)→−5
(1, 0, 0, 1, 0, 1, 1, 1, 1, 0)→−6 while the test dataset may be:
(1, 0, 1, 0, 1, 0, 1, 1, 0, 1)→−6
(0, 1, 0, 0, 0, 0, 1, 0, 1, 0)→−3
(0, 0, 1, 1, 0, 1, 0, 0, 0, 0)→−14
(1, 1, 1, 1, 1, 1, 1, 1, 1, 1)→−10
(0, 1, 0, 1, 1, 0, 0, 0, 1, 0)→−4
(1, 1, 1, 1, 0, 0, 0, 1, 0, 1)→−6
(0, 0, 0, 1, 0, 1, 0, 1, 1, 0)→−4
(1, 1, 0, 0, 1, 1, 1, 0, 1, 0)→−6
(0, 1, 0, 0, 0, 0, 0, 0, 1, 1)→−3
(0, 0, 1, 0, 1, 0, 0, 0, 1, 1)→−4 where in both cases the left side (before "→") shows the input vector x while the right side shows the result of evaluating the function f(x). These input-output pairs are stored in the database.

The QUBO coefficients are found by fitting the training dataset to the QUBO form. Using the values of the training dataset shown above, the QUBO coefficients are found to be as follows:

---
[−1.10000000e+01 −1.00000000e+00 −4.98417242e+00 1.34405934e+01
4.74638024e−01 −6.41667455e−01 7.58375130e−01 4.60428693e+00
−6.45131068e+00 −1.00000000e+00 1.01515804e+01 −3.27001514e+00
3.49633292e+00 2.21384972e+00 8.47733510e−01 2.38565818e+00
8.84356960e−01 −2.70048263e+00 6.71235923e+00 −2.21384972e+00
2.43683165e−03 −7.73242169e+00 1.88229867e+00 5.37768525e+00
9.60648718e+00 7.73379389e+00 3.78397369e+00 −6.04057443e+00
−3.55576323e+00 1.41662724e+00 −5.47066339e+00 −8.20769850e+00
−1.51142708e+00 −5.84624302e+00 −2.58233179e+00 3.40952967e+00
8.68929214e+00 −5.35059620e+00 −1.08959497e+00 5.99153024e−01
−1.62621842e+00 −1.15209615e+01 −7.69717044e+00 3.60643986e+00
3.08157471e+00 5.41707675e+00 −7.36266206e+00 −1.80680420e+00

-continued

```
4.06413836e+00 -1.86535914e+00 3.57942178e+00 -1.13804770e+00
-3.48490584e-01 -4.75679001e-01 -2.03792467e+00 -4.65008990e+00]
``` where the first coefficient corresponds to the constant term, the following 10 coefficients correspond to the linear terms $c_i$ and the rest of the terms correspond to the quadratic coefficients $Q_{ij}$.

Following this, the quality of the QUBO formulation is evaluated by computing the difference between the outputs of the initial form f(x) to the outputs of the QUBO formulation for all vectors of the test dataset and using the average as aggregator. In this case, the average test error is 291.57 which is well above the chosen threshold of 1e-6.

In view of this the system notifies the user that a bad fit has been achieved. In response, the user updates the formulation of the constraint function in the following way:

```
def logical_constraint(x): return all((i+1,j+1) in E for (i, j)
    Before in combinations(range(N),2) if x[i]==1 and x[j]==1)
↓
After def logical_constraint(x): return sum(int((i+1,j+1) in E if x[i]==1 and x[j]==1 also True)
    for (i, j) in combinations(range(x),2)))
```

The process is repeated, new training and test datasets are generated using the updated function f(x) and new QUBO coefficients are found using the new training dataset. The new set of QUBO coefficients is as follows:

```
[-4.95000000e+02 -1.00000000e+00 -1.00000000e+00 -1.00000000e+00
-1.00000000e+00 -1.00000000e+00 -1.00000000e+00 -1.00000000e+00
-1.00000000e+00 -1.00000000e+00 -1.00000000e+00 1.10000000e+01
-7.27595761e-12 1.10000000e+01 1.10000000e+01 1.10000000e+01
1.10000000e+01 1.10000000e+01 1.10000000e+01 1.10000000e+01
1.10000000e+01 3.18323146e-12 1.72803993e-11 1.10000000e+01
1.10000000e+01 1.10000000e+01 1.10000000e+01 1.10000000e+01
1.45519152e-11 1.10000000e+01 -1.02318154e-11 6.59383659e-12
1.10000000e+01 3.63797881e-12 1.10000000e+01 1.10000000e+01
1.27329258e-11 6.36646291e-12 -2.27373675e-12 -1.13686838e-11
1.10000000e+01 1.10000000e+01 2.04636308e-12 8.64019967e-12
1.10000000e+01 1.10000000e+01 3.18323146e-12 1.10000000e+01
3.97903932e-12 1.10000000e+01 9.09494702e-13 -1.93267624e-12
1.36424205e-12 1.10000000e+1 1.10000000e+01 1.10000000e+01]
```

The new QUBO formulation is again evaluated using the test procedure and the average test error for the new QUBO is found to be 1.2e-11 which is well below the threshold. The user is therefore notified of a good fit and the system returns the coefficients above.

Finally, the QUBO coefficients above are transferred to the Ising Machine (for example, Fujitsu's Digital Annealer™) which, after a number of iterations, finds the expected optimal solution x=(0, 0, 1, 1, 0, 1, 1, 0, 1, 0).

The coefficients of the QUBO formulation found perfectly match the coefficients of the shortest known QUBO formulation for the Maximum Clique problem below:

$$H = -A\sum_{i=1}^{N} x_i + B \sum_{(i,j)\in E} x_i x_j,$$

While the expression above was manually derived based on deep mathematical insight, the present system is able to derive it automatically in numerical form.

Figure 9:
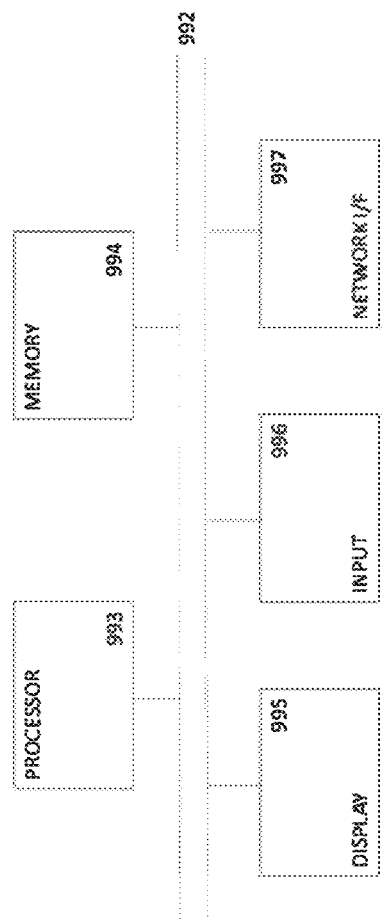
FIG. 9 is a block diagram of a computing device suitable for carrying out a method according to an embodiment.

FIG. 9 is a block diagram of a computing device, such as a data storage server, which embodies the present invention, and which may be used to implement some or all of the operations of a method embodying the present invention, and perform some or all of the tasks of apparatus of an embodiment. For example, the computing device of FIG. 9 may be used to implement all the tasks of the apparatus illustrated in FIG. 4A and perform all the operations of the method shown in FIG. 4B, or only to implement one or more of the processes of FIGS. 6, 7 and 8.

The computing device comprises a processor 993, and memory, 994. Optionally, the computing device also includes a network interface 997 for communication with other such computing devices, for example with other computing devices of invention embodiments.

For example, an embodiment may be composed of a network of such computing devices. Optionally, the computing device also includes one or more input mechanisms such as keyboard and mouse 996, and a display unit such as one or more monitors 995. The components are connectable to one another via a bus 992.

The memory 994, which may store the database 22, may include a computer readable medium, which term may refer to a single medium or multiple media (e.g., a centralized or distributed database and/or associated caches and servers) configured to carry computer-executable instructions or have data structures stored thereon. Computer-executable instructions may include, for example, instructions and data accessible by and causing a general purpose computer, special purpose computer, or special purpose processing device (e.g., one or more processors) to perform one or more functions or operations. For example, the computer-executable instructions may include those instructions for implementing all the tasks or functions to be performed by each or all of the various components in the apparatus illustrated in FIG. 4A, or performing all the operations of the method shown in FIG. 4B, or only to implement one or more of the processes of FIGS. 6, 7, and 8. And such instructions may be executed by one or more processor 993. Thus, the term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

Figure 7:
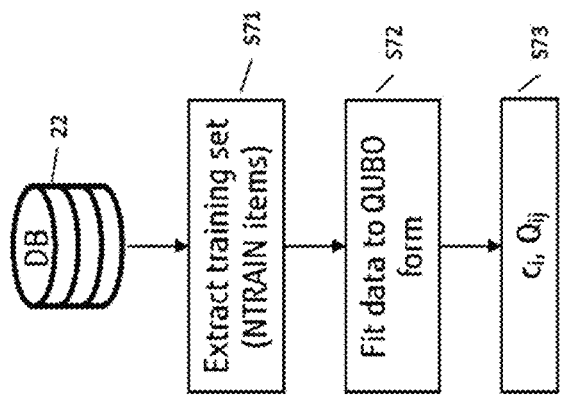
FIG. 7 is a flowchart of a QUBO generation process for use in an embodiment.

The processor 993 is configured to control the computing device and execute processing operations, for example executing computer program code stored in the memory 994 to implement the methods described with reference to FIGS. 4A, 6, 7 and/or 8 and defined in the claims. The memory 994 stores data being read and written by the processor 993. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and operations discussed herein.

The display unit 995 may display a representation of data stored by the computing device and may also display a cursor and dialog boxes and screens enabling interaction between a user and the programs and data stored on the computing device. For example, the display unit 995 may display the multivariate data to be imagified and the resulting images. The input mechanisms 996 may enable a user to input data, such as the multivariate data to be imagified, and instructions to the computing device.

The network interface (network I/F) 997 may be connected to a network, such as the Internet, and is connectable to other such computing devices via the network. The network I/F 997 may control data input/output from/to other apparatus via the network. Other peripheral devices such as microphone, speakers, printer, power supply unit, fan, case, scanner, trackerball, etc., may be included in the computing device.

Methods embodying the present invention may be carried out on a computing device such as that illustrated in FIG. 9. Such a computing device need not have every component illustrated in FIG. 9, and may be composed of a subset of those components. A method embodying the present invention may be carried out by a single computing device in communication with one or more data storage servers via a network. The computing device may be a data storage itself storing at least a portion of the data.

A method embodying the present invention may be carried out by a plurality of computing devices operating in cooperation with one another. One or more of the plurality of computing devices may be a data storage server storing at least a portion of the data.

The above-described embodiments of the present invention may advantageously be used independently of any other of the embodiments or in any feasible combination with one or more others of the embodiments.

What is claimed is:

1. An Ising machine data input apparatus to communicate with a computer operating as an Ising machine, the Ising machine data input apparatus, comprising:
   an inputter to receive an input expression representing an optimization problem, formulation of the input expression received by the inputter being in a format unsuitable for inputting into the computer operating as the Ising machine;
   a converter to carry out a conversion process to convert the input expression, which is received through the inputter, from the format unsuitable for inputting into the computer operating as the Ising machine to a format suitable for inputting into the computer operating as the Ising machine, the converter including:
      a dataset creator to receive the input expression from the inputter and create a dataset of input-output data pairs on basis of an evaluation of the formulation of the input expression, whereby a set number of data points are identified to create the dataset of input-output pairs to evolve the optimization problem as initially represented in the input expression received through the inputter into a form in the format suitable for inputting into the computer operating as the Ising machine,
      a database to store the dataset of input-output data pairs created by the dataset creator, including a first subset of the dataset which forms a training dataset and a second subset of the dataset which forms a test data set, the second subset of the dataset being different from the first subset of the dataset,
      a fitter to obtain the first subset of the dataset stored in the database and derive a mathematical expression by fitting the first subset of the dataset obtained from the database to coefficients of an exemplary mathematical expression in the format suitable for inputting into the Ising machine, and
      a tester to compare an output value produced by the formulation of the input expression received and an output value produced by input-output data pairs of the test data set formed by the second subset to thereby assess whether an aggregated difference value between the formulation of the input expression received and the derived mathematical expression meets a preset quality threshold; and
   a validator to output, by the Ising machine data input apparatus, the derived mathematical expression, as the optimization problem in the format suitable for input to the computer operating as the Ising machine, when the derived mathematical expression is assessed as meeting the preset quality threshold, and cause the converter to repeat the conversion process when the derived mathematical expression is assessed as being below the preset quality threshold;
   wherein the converter repeats the conversion process using a different input expression representing the optimization problem until the aggregated difference value between the formulation of the input expression and the derived mathematical expression is below the preset quality threshold, the conversion process to allow a human user to input the different input expression.

2. The Ising machine data input apparatus as claimed in claim 1, wherein the format suitable is a Quadratic Unconstrained Binary Optimization—QUBO—formulation, a Cubic Unconstrained Binary Optimization—CUBO—formulation, or a higher order Unconstrained Binary Optimization formulation.

3. The Ising machine data input apparatus as claimed in claim 1, wherein the dataset is created by a software interpreter.

4. The Ising machine data input apparatus as claimed in claim 1, wherein a number of input-output data pairs in the first subset is equal to a number of coefficients in the exemplary mathematical expression.

5. The Ising machine data input apparatus as claimed in claim 1, wherein repeating the conversion process includes prompting the human user to input the different input expression.

6. The Ising machine data input apparatus as claimed in claim 1, wherein whether the derived mathematical expression meets the preset quality threshold is assessed by determining whether outputs obtained using the derived mathematical expression are sufficiently similar to results obtained using the input expression.

7. The Ising machine data input apparatus as claimed in claim 6, wherein the results are determined to be sufficiently similar when a difference between the results meets a preset criterion.

8. The Ising machine data input apparatus as claimed in claim 7, wherein the preset criterion is that the difference between the results is below a preset threshold.

9. The Ising machine data input apparatus as claimed in claim 7, wherein the difference is the aggregated difference value.

10. The Ising machine data input apparatus as claimed in claim 1, wherein the input expression is in non-binary form.

11. The Ising machine data input apparatus as claimed in claim 1, wherein the input expression is not a mathematical expression.

12. The Ising machine data input apparatus as claimed in claim 1, wherein formulation of the different input expression is guided by the human user.

13. A computer-implemented method of an Ising machine data input apparatus to communicate with a computer operating as an Ising machine, the computer-implemented method comprising:

receiving, by an inputter, an input expression representing an optimization problem, formulation of the input expression received by the inputter being in a format unsuitable for inputting into the computer operating as the Ising machine;

carrying out a conversion process, by a converter, to convert the input expression, which is received through the inputter, from the format unsuitable for inputting into the computer operating as the Ising machine to a format suitable for inputting into the computer operating as the Ising machine, the converter including:

a dataset creator to receive the input expression from the inputter and create a dataset of input-output data pairs on basis of an evaluation of the formulation of the input expression, whereby a set number of data points are identified to create the dataset of input-output pairs to evolve the optimization problem as initially represented in the input expression received through the inputter into a form in the format suitable for inputting into the computer operating as the Ising machine, a database to store the dataset of input-output data pairs created by the dataset creator, including a first subset of the dataset which forms a training dataset and a second subset of the dataset which forms a test data set, the second subset of the dataset being different from the first subset of the dataset;

a fitter to obtain the first subset of the dataset stored in the database and derive a mathematical expression corresponding to the input expression received by fitting first subset of the dataset obtained from the database to coefficients of an exemplary mathematical expression in the format suitable for inputting into the Ising machine; and a tester to compare an output value produced by the formulation of the input expression received and an output value produced by input-output data pairs of the test data set formed by the second subset to thereby determine whether an aggregated difference value between the formulation of the input expression received and the derived mathematical expression meets a preset quality threshold; and outputting, by a validator, the derived mathematical expression, as the optimization problem in the format suitable, for input to the Ising machine, when the derived mathematical expression is assessed as meeting the preset quality threshold, and cause the converter to repeat the conversion process when the derived mathematical expression is assessed as being below the preset quality threshold, wherein the converter repeats the conversion process using a different input expression representing the optimization problem until the aggregated difference value between the formulation of the input expression and the derived mathematical expression is below the preset quality threshold, the conversion process to allow a human user to input the different input expression.

14. A non-transitory machine-readable storage medium storing instructions executable by at least one processor to execute a process of an Ising machine data input apparatus, the process comprising:

receive, by an inputter, an input expression representing an optimization problem, formulation of the input expression received by the inputter being in a format unsuitable for inputting into an Ising machine;

carry out a conversion process, by a converter, to convert the input expression, which is received through the inputter, from the format unsuitable for inputting into the Ising machine to a format suitable for inputting into the Ising machine, the converter including:

a dataset creator to receive the input expression from the inputter and create a dataset of input-output data pairs on basis of an evaluation of the formulation of the input expression, whereby a set number of data points are identified to create the dataset of input-output pairs to evolve the optimization problem as initially represented in the input expression received through the inputter into a form in the format suitable for inputting into the Ising machine, a database to store the dataset of input-output data pairs created by the dataset creator, including a first subset of the dataset which forms a training dataset and a second subset of the dataset which forms a test data set, the second subset of the dataset being different from the first subset of the dataset;

a fitter to obtain the first subset of the dataset stored in the database and derive a mathematical expression by fitting the first subset of the dataset obtained from the database to coefficients of an exemplary mathematical expression in the format suitable for inputting into the Ising machine; and a tester to compare an output value produced by the formulation of the input expression and an output value produced by input-output data pairs of the test data set formed by the second subset to determine whether an aggregated difference value between the formulation of the input expression and the derived mathematical expression meets a preset quality threshold; and outputting, by a validator, the derived mathematical expression, as the optimization problem in the format suitable for input to the Ising machine, when the derived mathematical expression is assessed as meeting the preset quality threshold, and cause the converter to repeat the conversion process when the derived mathematical expression is assessed as being below the preset quality threshold, wherein the converter repeats the conversion process using a different input expression representing the optimization problem until the aggregated difference value between the formulation of the input expression and the derived mathematical expression is below the preset quality threshold, the conversion process to allow a human user to input the different input expression.

* * * * *